(12) United States Patent
Arcidiacono et al.

(10) Patent No.: US 10,680,701 B2
(45) Date of Patent: Jun. 9, 2020

(54) METHOD FOR ADAPTIVE DEMODULATION AND SYSTEM IMPLEMENTING SUCH A METHOD

(71) Applicants: EUTELSAT S A, Paris (FR); M.B.I. S.r.l., Piazza Aemerina (IT)

(72) Inventors: Antonio Arcidiacono, Paris (FR); Daniele Vito Finocchiaro, Paris (FR); Rocco Mauro Bueti, Pisa (IT); Marco Andrenacci, Pisa (IT)

(73) Assignees: EUTELSAT S A, Paris (FR); M.B.I. S.r.l., Piazza Aemerina (IT)

( * ) Notice: Subject to any disclaimer, the term of this patent is extended or adjusted under 35 U.S.C. 154(b) by 0 days.

(21) Appl. No.: 16/292,698

(22) Filed: Mar. 5, 2019

(65) Prior Publication Data

US 2019/0280762 A1 Sep. 12, 2019

(30) Foreign Application Priority Data

Mar. 6, 2018 (EP) ..................................... 18305235

(51) Int. Cl.
*H04B 7/185* (2006.01)
*H01Q 3/34* (2006.01)
*H04B 7/19* (2006.01)

(52) U.S. Cl.
CPC ........... *H04B 7/18513* (2013.01); *H01Q 3/34* (2013.01); *H04B 7/18515* (2013.01);
(Continued)

(58) Field of Classification Search
CPC ... H01Q 3/34; H04B 7/18513; H04B 7/18515
(Continued)

(56) References Cited

U.S. PATENT DOCUMENTS

| 3,553,693 | A | | 1/1971 | Lockerd et al. |
| 5,742,639 | A | * | 4/1998 | Fasulo, II ............... H04B 1/40 332/103 |

(Continued)

FOREIGN PATENT DOCUMENTS

WO WO 95/19078 A1 7/1995
WO WO 2015/160409 A1 10/2015

OTHER PUBLICATIONS

European Search Report as issued in European Patent Application No. 18305235.6, dated Dec. 11, 2018.

*Primary Examiner* — Tan H Trinh
(74) *Attorney, Agent, or Firm* — Pillsbury Winthrop Shaw Pittman LLP

(57) ABSTRACT

A method performed on-board by a satellite for processing a signal received from a terminal during a current time interval, includes receiving, during the current time interval, a main signal containing a message from a terminal, each message having a priority level; sampling the main signal to obtain samples; storing the obtained samples into the satellite memory; first demodulating the messages corresponding to the current time interval contained in the samples stored in memory; when the satellite is in the range of a ground station, transmitting to the ground station the content of the memory. The first demodulating includes, for each message of the messages contained in the samples and by priority order: demodulating and decoding the message; forwarding, using direct link or inter-satellite-link, the demodulated message to a ground station; estimating the number of remaining non-demodulated messages in the samples stored in the memory.

13 Claims, 4 Drawing Sheets

(52) U.S. Cl.
CPC .......... *H04B 7/18519* (2013.01); *H04B 7/19* (2013.01); *H04B 7/18521* (2013.01); *H04B 7/18532* (2013.01)

(58) Field of Classification Search
USPC .... 455/9, 512, 12.1, 11.1, 3.02, 15, 73, 426; 375/200, 219, 324, 347; 713/400; 332/103
See application file for complete search history.

(56) References Cited

U.S. PATENT DOCUMENTS

| | | | |
|---|---|---|---|
| 5,930,295 A * | 7/1999 | Isley, Jr. ............ | H04B 7/18563 375/219 |
| 2002/0106041 A1 * | 8/2002 | Chang ................ | H04B 7/18515 375/347 |
| 2006/0031696 A1 * | 2/2006 | King ....................... | H04L 7/042 713/400 |
| 2009/0161797 A1 | 6/2009 | Cowles et al. | |
| 2013/0102240 A1 * | 4/2013 | Helfers .............. | H04B 7/18513 455/3.02 |
| 2014/0287679 A1 * | 9/2014 | Linn ................. | H04B 7/18513 455/12.1 |
| 2016/0037434 A1 | 2/2016 | Gopal et al. | |
| 2017/0111912 A1 * | 4/2017 | Keshet ................. | H04W 56/00 |
| 2018/0062788 A1 * | 3/2018 | Mayer ................ | H04B 7/18515 |
| 2019/0068282 A1 * | 2/2019 | Neuman .............. | H01Q 3/2682 |
| 2019/0268874 A1 * | 8/2019 | Ravishankar ......... | H04W 4/029 |
| 2019/0349075 A1 * | 11/2019 | Eberlein ............ | H04B 7/18513 |

\* cited by examiner

METHOD FOR ADAPTIVE DEMODULATION AND SYSTEM IMPLEMENTING SUCH A METHOD

CROSS REFERENCE TO RELATED APPLICATIONS

This application claims priority to European Patent Application No. 18305235.6, filed Mar. 6, 2018, the entire content of which is incorporated herein by reference in its entirety.

FIELD

The invention is related to telecommunication protocols optimized for use on a constellation of LEO satellites. More particularly, the invention is related to an adaptive demodulation system and method which insure a flexible adaptation to different service requirements, achieving low cost and high efficiency by a mix of short-delay and delay-tolerant capabilities within the same system.

BACKGROUND

In the design of Low Earth Orbital (hereafter LEO) constellation, a careful compromise must be done between satellite capabilities (e.g. power consumption and available memory), ground segment (e.g. number of ground stations and feeder link capacity) and service requirement (e.g. network capacity and processing delay).

Usually four main solutions can be identified to bring the signal from a terminal to a ground station. In the first solution, the signal is received by a satellite and immediately sent to a ground station in visibility. This solution ensures a real-time service but requires a very high number of ground stations to make sure that there is always a ground station in visibility. Another solution illustrated in FIG. 1A is to sample and store the signal received by the satellite in the on-board satellite memory. The stored samples are then sent to a ground station once there is one in visibility. Such a system requires a lower number of ground stations but cannot insure a real-time service. Furthermore, it requires a large memory on board to be able to store all the received samples and a high capacity feeder link to be able to send all the stored samples to the ground station. Yet another solution illustrated in FIG. 1B is to sample the signal received by the satellite and send the samples using Inter-Satellite-Link (hereafter ISL) to another satellite which will send the samples to a ground station. Such a system requires high capacity ISL and feeder link but can insure a real-time service. A fourth solution is to process (e.g. sampling and demodulating) the received signal on board before either send it to a ground station if there is one visible, or use ILS as described previously. It should be noted that since the signal is already processed the requirement in term of ILS or feeder link capacity is lowered compared to the solutions described previously. However, such a solution requires a high processing power on-board which also means a high-power consumption.

None of the above solutions propose a method where some messages can be processed so as to insure a real-time service while other messages can be processed so to insure an acceptable delay in the transmission.

There is a need of a method that allows a transmission system to insure, when needed, a short-delay delivery of messages sent by terminals, while limiting the impact of such a short delay delivery on the on-board processing power, on-board memory and on the bandwidth of the inter-satellite link. There is also a need for a method that takes advantage of high-gain antenna arrays, appropriate for communication with low power small terminals, even on-board small satellites with limited resources, obtaining a cost-effective link in terms of speed and cost per bit. There is also a need for a method that enables operation of small satellites in environments with potentially high interference from other uncorrelated terminals.

SUMMARY

An aspect of the invention solves the above problem by proposing a flexible adaptation to different service requirements, achieving low cost and high efficiency by a mix of short-delay and delay-tolerant capabilities within the same system. This is achieved thanks to an adaptive demodulation system and method which insure that high priority messages are demodulated on-board for short-delay transmission while delegating the demodulation of lower priority messages to ground stations when it is needed. Thanks to the adaptive approach, the invention also allows to use efficiently a high-gain antenna array on the satellite, so as to be able to communicate with very small terminals.

A first aspect of the invention concerns a method for processing a signal received from at least one terminal during a given time interval, called current time interval, the method being performed on-board by a satellite; the satellite comprising a memory and a processing system adapted to process data contained in the memory; the method comprising:

- a step of receiving, during the current time interval, a signal, the main signal, containing at least one message from at least one terminal, each message having a priority level;
- a step of sampling the main signal to obtain samples;
- a step of storing the obtained samples into the satellite memory;
- a step of demodulating the messages corresponding to the current time interval contained in the samples stored in memory;
- when the satellite is in the range of a ground station a step of transmitting to the ground station the content of the memory;
- where the demodulation step comprises, for each message of the messages contained in the samples and by priority order:
  - a sub-step of demodulation and decoding the message;
  - a sub-step of forwarding, using direct link or inter-satellite-link, the demodulated message to a ground station;
  - the demodulation sub-steps being repeated until there is not enough processing power.

This method implements an adaptive demodulation system which insures that high priority messages are demodulated on-board for short-delay transmission, while delegating the demodulation of lower priority messages to ground stations when it is needed. A time interval can correspond to one of several time slots. A time slot is an interval of time sufficiently long to contain the longest possible message. It is meant by "not enough processing power" that the satellite SAT processing system MP is capable to demodulate a limited number of messages per second (e.g. 50 messages per second) or so by time interval.

In an embodiment, the method comprises, when the satellite is not in the range of a ground station, a step of transmitting to the ground station using inter-satellite link the content of the memory.

In an embodiment, the demodulations step further comprises:
- a sub-step of estimating the number of remaining non-demodulated messages in the samples stored in the memory;
- if there are no remaining messages, a sub-step of deleting the samples in the satellite memory;

This allows to use efficiently the memory when samples are no longer needed. For example a low-orbit satellite will fly over seas and oceans for a significant part of its orbit. During these periods the number of messages received will probably be very small, so it is possible to demodulate all of them onboard and the samples are deleted from memory. In more crowded regions, only the highest priority messages are demodulated onboard, and the samples are kept in memory for further processing on-ground.

In an embodiment, in the sub-step of forwarding the demodulated messages to a ground station, additional information concerning the demodulated messages is forwarded along with their corresponding messages.

This information can then be used to accelerate the on-ground demodulation process.

In an embodiment, to obtain the additional information, the method comprises:
- a step of receiving, a low bit rate signal from at least one terminal;
- a step of demodulating the low bit rate signal;
- a step of extracting information from the demodulated low bit rate signal, the information containing data concerning the main signal sent or to be sent by the user terminal.

Hence, the terminal can send information using an auxiliary signal received by the single feed low-gain antenna and easily demodulated by the satellite to provide information that will be used to demodulate (either on-board or on-ground) the main signal.

In an embodiment, the information contained in the demodulated low bit rate signal includes one or more of the following information: the current position, direction of movement and speed of the terminal, the time of transmission of the main signal and/or the frequency slot used for transmission of the main signal, the scrambling code and/or the spreading factor and/or the EIRP used for transmission of the main signal. The expert in the art will recognize that other parameters can be added, that will simplify the on-ground demodulation process or make it more efficient.

In an embodiment, the information received through the low bitrate signal is used to determine a period of time during which the sampling step is performed or to determine which samples are sent to the ground station.

Therefore, the sampling of the signal is only performed when needed and not continuously.

In an embodiment, the method comprises, after the step of extracting information from the demodulated low bit rate signal, a step of acknowledging the receipt of the low bit rate signal in which the acknowledgement indicates the time to start emitting and/or the frequency slot, and/or other transmission parameters (spreading factor, scrambling code, EIRP, . . . ) to use for the transmission of the main signal.

In an embodiment, the frequency slot to use is chosen by performing a real-time spectrum analysis of portions of the spectrum to be used for the main signal emission and selecting the preferred frequency slot or the frequency slots to use (e.g. those with the less interferences). Therefore, the signal shall be received by the satellite with a low interference from other uncorrelated terminals, thus increasing the quality of the service (e.g. lower bit error rate). This is especially useful if non-licensed frequency bands are used, where the sources of interference cannot be managed nor known in advance.

In an embodiment, the step of receiving a signal from at least one terminal is preceded by a step of sending, using at least one terminal, a main signal comprising at least one message, the signal being emitted using a first effective radiated power when its priority level is above a predefined value and using a second effective radiated power otherwise.

Therefore, the priority of a given message can be coded in the effective radiated power used to send the message.

In an embodiment, the step of receiving a signal from at least one terminal is preceded by a step of sending, using at least one terminal, a main signal comprising at least one message, the signal being emitted using a first frequency slot when its priority level is above a predefined value and using a second frequency slot otherwise.

Therefore, the priority of a given message can be coded in the frequency slot used to send the message.

In an embodiment, the step of demodulation of messages contained in the samples stored is also applied to samples received during time intervals previous to the current time interval, the samples corresponding to the current time interval being processed first.

This is particularly useful when the satellite flies over a scarcely populated region, since the processing power is not only used to process samples related to the current time interval but also, once all the messages related to the current time interval have been demodulated, to process the samples related to past time intervals and that are still in memory.

A second aspect of the invention concerns a method for processing a signal received from at least one terminal, the method being performed on-board by a satellite equipped with an antenna array comprising a plurality of elements; the satellite comprising a memory and processing system adapted to process data contained in the memory; the method comprising:
- a step of receiving a low bit rate signal from at least one terminal;
- a step of demodulating the low bit rate signal received from the terminal;
- a step of extracting information from the demodulated low bit rate signal, the information containing data concerning a signal, the main signal, sent or to be sent by the terminal;
- a step of receiving, the main signal containing at least one message from at least one terminal;
- a step of sampling the main signal received by each element of the antenna array;
- a step of storing the sampled main signal in the satellite memory;
- when the satellite is in the range of an on-ground station, a step of transmitting the stored samples to the ground station for further processing along with information extracted from the demodulated low bit rate signal and corresponding to the stored samples.

Such a method allows to use an on-board antenna array with high gain, optimizing its gain in the direction of the transmitting terminals, and therefore allow low cost low power terminals to communicate with a satellite implementing a method. In fact, the terminals do not need to use a high-gain antenna nor to transmit with a high EIRP.

In an embodiment, the method comprises, when the satellite is not in the range of a ground station, a step of transmitting the stored samples to the ground station using an inter-satellite link, for further processing along with information extracted from the demodulated low bit rate signal and corresponding to the stored sample.

In an embodiment, the information contained in the demodulated low bit rate signal includes one or more of the following information: the current position, direction of movement and/or speed of the terminal, the time of transmission of the main signal and/or the frequency slot used for transmission of the main signal, the scrambling code and/or the spreading factor and/or the EIRP used for transmission of the main signal. The expert in the art will recognize that other parameters can be added, that will simplify the demodulation process or make it more efficient. For example, knowing the direction of movement and speed allows the demodulator to compensate for the Doppler shift in the signal.

In an embodiment, the information received through the low bitrate signal is used to determine a period of time during which the sampling step is performed or to determine which samples are sent to the ground station.

In an embodiment, the method comprises, after the step of extracting information from the demodulated low bit rate signal, a step of acknowledging the receipt of the low bit rate signal in which the acknowledgement indicates the time to start emitting and/or the frequency slot, and/or other transmission parameters (spreading factor, scrambling code, EIRP, . . . ) to use for the transmission of the main signal.

In an embodiment, the frequency slot to use is chosen by performing a real-time spectrum analysis of portions of the spectrum to be used for the main signal emission and selecting the preferred frequency slot or the frequency slots to use.

A third aspect of the invention concerns a method for demodulation of at least one message in a signal received by each element of an antenna array comprising for each message, given the position of the transmitting terminal, the time of transmission and the frequency slot used by the terminal:
- a step of generating numerically the appropriate phase shifts in the signals of each element of the antenna array to generate a maximum gain in the direction of the terminal and the maximum rejection of interference;
- based on the composition of signals using the phase shifts above, a step of demodulating and decoding the message.

Hence, it is possible to use information on the signal to facilitate the demodulation process either on-ground or on-board.

A fourth aspect of the invention concerns a satellite comprising a system adapted to execute the steps of the method according to the first aspect or the second aspect of the invention.

A fifth aspect of the invention concerns a computer program comprising machine executable instructions to cause the satellite according to the fourth aspect of the invention to execute the steps of the method according to the first or the second aspect of the invention.

A sixth aspect of the invention concerns a non-transitory computer-readable medium having stored thereon the computer program according to the fifth aspect of the invention.

DETAILED DESCRIPTION

In the following a signal sent by a terminal can comprise one or several messages. This signal can be sampled, and the samples obtained can correspond to one or several messages. More precisely, a sample can contain information that is relevant to one or several messages. In order to extract messages from samples, the samples need to be demodulated. Therefore, a message can be demodulated while other messages sharing common samples with the message can remain undemodulated. The term "extended modulation" is used to emphasize the fact that the processing power of a ground station is by far superior to the one available on board of a satellite.

Figure 1A:
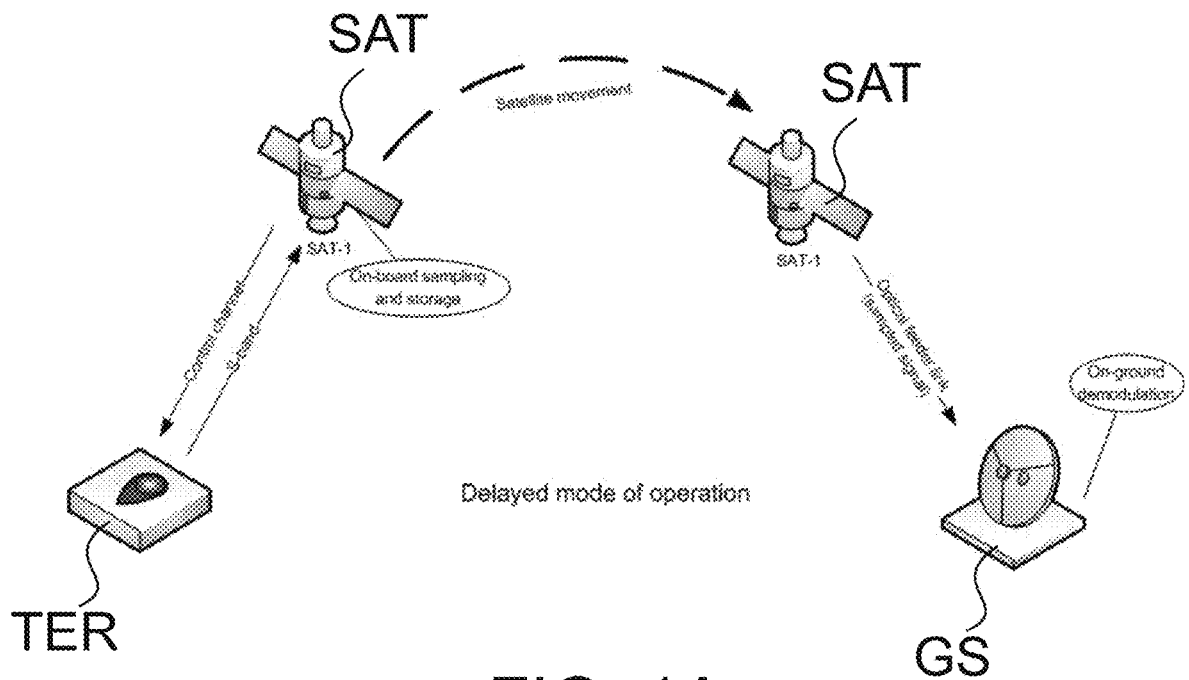
FIGS. 1A-B illustrate the two main processes to transmit signals using a LEO satellite constellation.
Figure 1B:
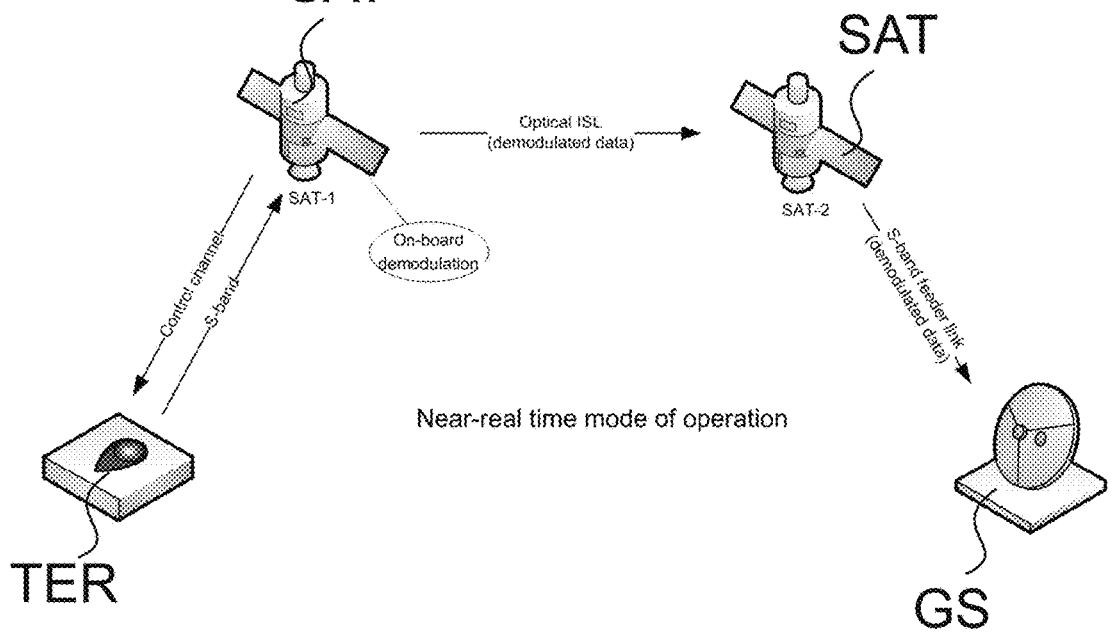
Figure 2:
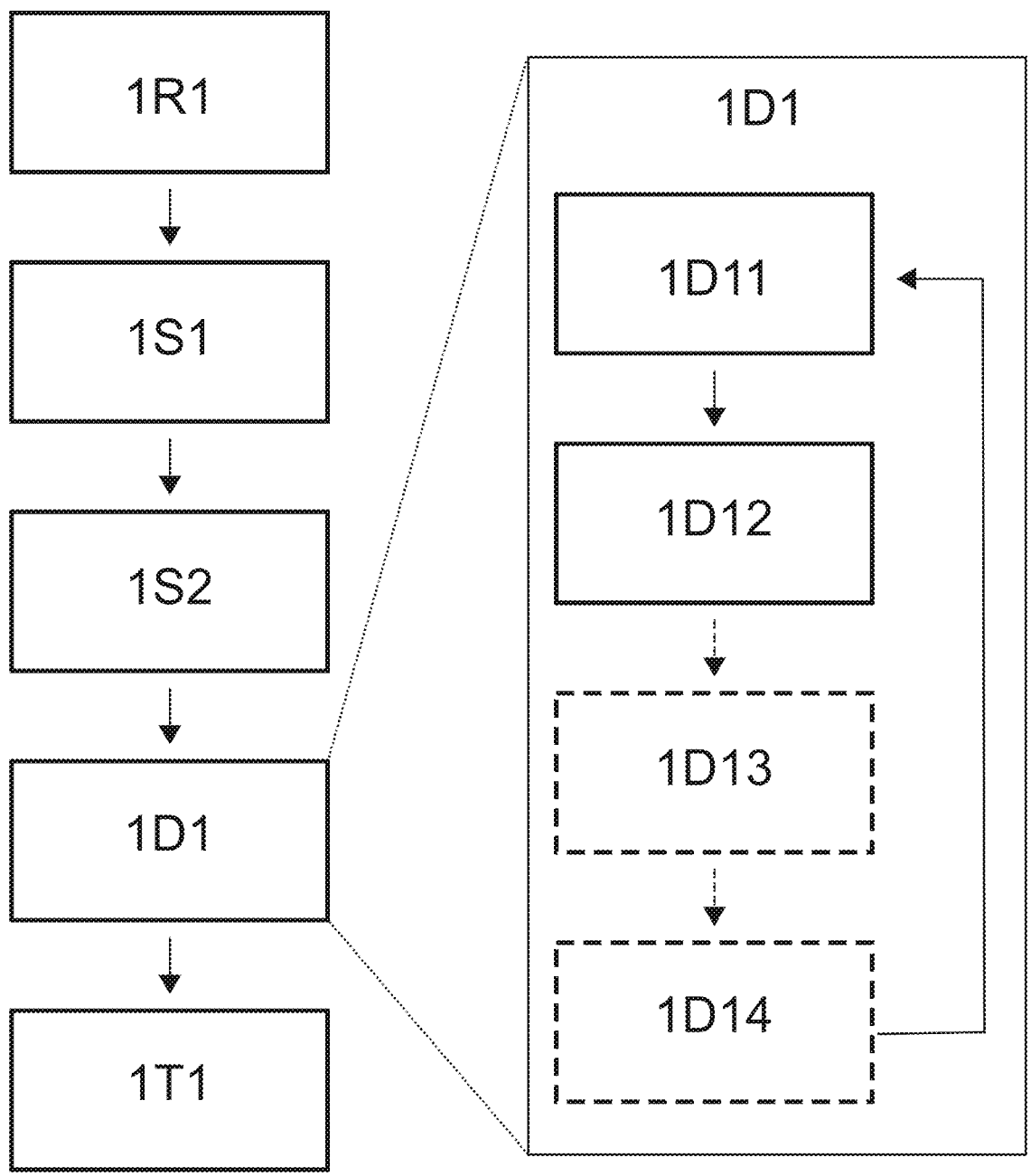
FIG. 2 illustrates a method according to a first embodiment of the invention.

In an embodiment of the first aspect of the invention illustrated in FIG. 2 concerns a method 100 for processing a signal received by a satellite SAT from at least one terminal TER, in general a plurality of terminals TER, during a given time interval the method being performed on-board by the satellite SAT receiving the signal. To implement such a method 100, the satellite SAT comprises a memory MM and a processing system MP arranged to process data contained in the memory MM. For example, the memory MM is a non-volatile memory such as a flash memory, a volatile memory such as a RAM (for Random Access Memory) memory or a combination of both. The processing system MP for processing data can be chosen among a processor (CPU/GPU, in which case the software can be modified over time via upgrades), an FPGA and/or an ASIC. The satellite also comprises an antenna array AN to receive signals emitted by terminals TER and a feeder link FL to send signals to ground stations GS and/or terminals TER. In an embodiment, the satellite also comprises an omnidirectional or low-gain antenna.

In an embodiment, the method comprises a step 1R1 of receiving a signal, the main signal, containing at least one message from at least one terminal TER, each message having a priority level. A plurality of signals coming from a plurality of terminals TER are usually received during this step 1R1. The priority level can be determined using different techniques depending on the protocol used by the terminal TER to send the signal. For instance, if the signal is sent using the ESSA protocol, then the priority level can be determined from the strength of the signal, the stronger the signal the higher the priority, or by the scrambling code or spreading factor used. If the signal is sent using the FDMA protocol, the priority level can be determined form the frequency used to send the signal, each frequency being associated with a priority level. In other words, terminals TER can be instructed, either statically or dynamically using some control channel, so as to send high priority signals at a certain EIRP, or using a specific frequency or scrambling code or spreading factor, so as to guarantee a high priority level of the signal and, likely, on-board demodulation. The transmission protocol used by the terminal TER or the plurality of terminals TER should have the following properties:
- an estimation of the total load (i.e. number of messages transmitted) can be done with limited processing power, e.g. the processing power available on a FPGA embarked on a LEO satellite;

even with limited processing power, at least a part of highest priority messages can be extracted, e.g. the 10 messages transmitted with a signal with maximum EIRP, or the 10 messages transmitted in the first 10 frequency slots;

with extended processing power, such as that available in computing facilities on-ground, all the remaining highest priority messages can be extracted from the signal, along with some or all of lower priority ones.

Such properties can be found in protocols based on spread spectrum waveform, such as the ESSA (Enhanced Spread Spectrum Aloha) protocol patented by ESA (European Space Agency). In the ESSA protocol, each terminal TER transmits a unique preamble, and then data in spread spectrum, normally using the same scrambling code, and over the same frequency channel, as other terminals TER, possibly at the same time (i.e. concurrent packets). Furthermore, with the ESSA protocol, during demodulation, the first phase (named "preamble search") allows to estimate the number of concurrent packets and a second phase allows to demodulate the packet(s) received with the strongest signal (e.g. high energy per symbol received value). Then, an extended demodulation, thanks to an iterative method (called "successive interference cancellation"), allows to demodulate packets received with weaker signal (e.g. low energy per symbol received value). It will be appreciated that the demodulation requires less processing power than the extended demodulation, and while it is desirable to perform the former on-board to ensure short delay delivery, it is easier to implement the latter on ground where the processing power is greater.

In this case the number of packets demodulated onboard is determined based on the processing power available onboard the satellite SAT. For a very small satellite SAT, such as a CubeSat, the processing power could be able to demodulate only a few highest priority messages per second. A larger satellite SAT could be able to demodulate a few tens of messages per second. The on-ground system performing the extended demodulation could demodulate thousands of messages per second, with current technology. It will be appreciated that these numbers depend on the technology evolution but the method 100 according to the invention can evolve along with technology by increasing the number of messages demodulated on board as the processing power available on-board increases.

The ESSA protocol is given here as an example but similar consideration can be made with other protocols sharing similar properties such as protocol derived from ESSA (such as S-MIM, S-M2M or F-SIM), Non-Orthogonal Multiple Access (NOMA) or FDMA. For instance, with the FDMA protocol where each terminal TER is assigned a separate frequency, the estimation of the load can be done by measuring the energy received on each frequency slot. Furthermore, the demodulation can be done on the first X slots where the number X depends on the processing power available on-board, and the extended demodulation can be performed on the remaining slots.

The method 100 also comprises a step 1S1 of sampling the main signal to obtain samples. In other words, the received signal is transformed in a series of numbers that can be stored, transmitted to another satellite SAT or to a ground station GS.

The method 100 further comprises a step 1S2 of storing the obtained samples corresponding to the current time interval into the satellite SAT memory MM. As mentioned before, the type of memory MM can be chosen among non-volatile memory and volatile memory.

The method 100 also comprises a step 1D1 of demodulation of messages corresponding to the current time interval contained in the samples stored in memory MM. The demodulation comprises for each message of the messages corresponding to the current time interval contained in the samples and by priority order:

a sub-step 1D11 of demodulation and decoding the message, which means that the messages having the highest priority number are being demodulated first;

a sub-step 1D12 of forwarding, directly or using intersatellite-link, the demodulated message to a ground station GS.

In an embodiment, the demodulation step 1D1 further comprises:

a sub-step 1D13 of estimating the number of remaining non-demodulated messages in the samples stored in the memory MM; and if there are no remaining messages, a sub-step 1D14 of deleting the samples in the satellite SAT memory MM.

The demodulation sub-steps 1D11, 1D12, 1D12, 1D14 are repeated until there is not enough processing power. It is meant by "not enough processing power" that the satellite SAT processing system MP is capable to demodulate a limited number of messages per second (e.g. 50 messages per second) and so by time interval. So, if during a certain interval of one second there are more than 50 terminals TER transmitting, only 50 can be demodulated onboard and not enough processing power will be available for the messages starting from the $51^{rst}$. It also means that once the current time interval is over, all the samples corresponding to messages that have not been demodulated will be kept in memory MM but shall not be demodulated on board anymore. They however will be transmitted to a ground station GS once the satellite SAT is at range, so as to be demodulated with extended demodulation. To do so, the method 100 further comprises, when the satellite SAT is in the range of a ground station GS, a step 1T1 of transmitting to the ground station GS the content of the memory MM. The memory MM contains samples of the current time interval and the past time intervals containing messages that have not been demodulated at the time when the ground station GS enters in the range of the satellite SAT.

However, in some cases, it can be beneficial not to wait until the satellite SAT is in the range of a ground station GS. Therefore, in an embodiment, when the satellite is not in the range of a ground station GS, the method comprises a step of transmitting to the ground station GS using inter-satellite link the content of the memory MM. In such a case the satellite SAT transmits the content of the memory to another satellite SAT, and so on until the last receiving satellite SAT is in the range of a ground station GS, and then transmits the content of the memory MM to the ground station GS.

When the satellite SAT flies over a populated region, the signal received by the satellite SAT (generally coming from a plurality of terminals TER) will generally contain an important number of messages, among which there are some with a higher priority. Thanks to the method 100 of the invention, the messages with the highest priority will be demodulated on board and transmitted to ground within few seconds, thus insuring a short-delay of end-to-end delivery, even if the satellite SAT is not at range of a ground station GS. Furthermore, as the samples corresponding only to the messages already demodulated are deleted from memory, the method permits a reduction of the memory MM requirements. It is worth mentioning that samples may correspond to the cumulated signal of a plurality of terminals TER. So, the samples are deleted only when the estimation algorithm tells that there are no other undemodulated messages contained in those samples. In other words, after deletion of the samples corresponding to already demodulated messages, the memory MM contains only samples where some undemodulated lower priority message is still present (according to the estimation), so that it can be demodulated later on-ground. Thanks to the method 100 according to the first aspect of the invention, the on-board processing power is utilized at its maximum to ensure that the highest priority messages are delivered with minimum delay, while lower priority messages will be processed on-ground with higher delay (since they need to wait until the satellite SAT is within the range of a ground station GS).

In an embodiment, the step 1 D1 of demodulation of messages contained in the samples stored is also applied to samples received during time intervals previous to the current time interval, the samples corresponding to the current time interval being processed first. In other words, the step 1 D1 of demodulation is also applied to samples received during previous time intervals, if at the end of the demodulation of samples corresponding to the current time interval (i.e. the estimation algorithm says that there are no more messages to be demodulated), there is still processing power available. This is particularly useful when the satellite SAT flies over a scarcely populated region, since the processing power is not only used to process samples related to the current time interval but also, once all the messages related to the current time interval have been demodulated, to process the samples related to past time intervals and that are still in memory. For instance, let's consider six consecutives time intervals and a satellite SAT that can process on-board a maximum of ten messages per time interval. If during the first time interval the number of messages received is equal to five, the five messages will be demodulated on board then sent to a ground station (either directly or using an inter-satellite link) and, at the end of the time interval, the satellite memory will contain no samples. If during the second time interval the number of message received is equal to fifteen, ten messages will be demodulated on-board then sent to a ground station and, at the end of the time interval, the satellite memory will contain the samples of the second time interval (containing the five undemodulated messages). Those samples can be sent to a ground station or kept in memory to be processed on-board during one of the next time interval. For instance, if during the third period of time the number of messages received is equal to five, the five messages corresponding to the current time interval will be demodulated first, then since there is still enough processing power, the five messages contained in the samples stored in memory can be demodulated as well and the ten messages (five from the current time interval and five for the previous interval of time) will be sent to a ground station (either directly or using an inter-satellite link). At this point the samples for current and previous time intervals can be deleted from memory as they do not contain any undemodulated message.

In an embodiment, in the sub-step 1D12 of forwarding the demodulated messages to a ground station GS, additional information concerning messages is forwarded along with their corresponding messages. The information concerning messages can include the exact time of reception of the signal containing the message by the satellite SAT, the power level of the received signal containing the message and/or the frequency of the signal containing the message. This information can help the ground station GS, more particularly its demodulator, to perform its tasks more efficiently, or can be stored for later analysis, reporting or processing. For instance, this information can be kept in some database to make later analysis e.g. on the performance of the transmission protocol.

In an embodiment, the step 1R1 of receiving a signal from at least one terminal TER is preceded by a step of sending, using at least one terminal TER, a signal comprising at least one message, the signal being emitted using a first effective radiated power when its priority level is above a predefined value and using a second effective radiated power otherwise. Therefore, the priority of a given message can be coded in the effective radiated power used to send the message.

In an embodiment, the step 1R1 of receiving a signal from at least one terminal TER is preceded by a step of sending, using at least one terminal TER, a signal comprising at least one message, the signal being emitted using a first frequency slot when its priority level is above a predefined value and using a second frequency slot otherwise. Therefore, the priority of a given message can be coded in the frequency slot used to send the message.

These two embodiments can be used as alternative or complementary solutions and allow the terminals TER to send the main signal according to the priority level of the messages to be contained in the main signal.

In an embodiment, to obtain the additional information, the satellite comprises single feed low-gain antenna LGA and the method comprises:
 a step of receiving, a low bit rate signal from at least one terminal TER using the low-gain antenna LGA;
 a step of demodulating the low bit rate signal; and
 a step of extracting information from the demodulated low bit rate signal, the information containing data concerning the main signal sent or to be sent by the user terminal TER.

Hence, the terminal TER can send information using an auxiliary signal received by the single feed low-gain antenna LGA and easily demodulated by the satellite SAT to provide information that will be used to demodulate (either on-board or on-ground) the main signal sent by the terminal TER in a more efficient way. In an embodiment, these steps are performed before the step 1R1 of receiving, during the current time interval, a signal containing at least one message from at least one terminal TER. The low-gain antenna LGA may be a dedicated antenna or a part of the antenna array (e.g. a circuit that takes the signal received by a small number of array elements, so as to obtain the desired gain).

In an embodiment, the information contained in the demodulated low bit rate signal includes the current position, direction of movement and/or speed of the terminal TER, the time of transmission of the main signal and/or the frequency slot used for transmission of the main signal and/or other parameters as described before.

In an embodiment, the information received through the low bitrate signal is used to determine a period of time during which the sampling step is performed, or to determine which samples are stored in memory MM and/or transmitted to ground.

In an embodiment, when the low-bit rate signal is received before the step 1R1 of receiving, during the current time interval, a signal containing at least one message from at least one terminal TER, the method 100 comprises, after the step of extracting information from the demodulated low bit rate signal, a step of acknowledging the receipt of the low bit rate signal in which the acknowledgment indicates the time to start emitting and/or the frequency slot to use. In an embodiment, the frequency slot to use is chosen by performing a real-time spectrum analysis of portions of the spectrum to be used for the signal emission and selecting the preferred frequency slot or the frequency slots to use (e.g. those with the less interferences).

The method 100 according to a first aspect of the invention implements an adaptive demodulation that allows for an optimal use of the processing power on board of the satellite SAT, this processing power being used to demodulate only part of the signal received which allows for high priority messages to be delivered with minimum delay. But it is also possible to implement an adaptive demodulation scheme in which the signal demodulated on board is not performed on higher priority message but rather on low bit rate signal emitted by a terminal TER and containing information about the main signal the terminal TER emitted or is about to emit. This information could then be used to insure a proper coordination between the satellite SAT and the terminal TER or terminals TER but also to improve the efficiency in the on-ground demodulation of the signal emitted by the terminal(s). More particularly, such a method allows to use an on-board antenna array AN with high gain, optimizing its gain in the direction of the transmitting terminals TER, and therefore allow low cost low power terminals TER to communicate with a satellite implementing a method according to the second aspect of the invention. Each element of the antenna array AN shall sample the received signal and, at a later moment, by appropriately combining the signals of each element, obtain a much higher gain in a specific direction, the direction being determined by the information provided by the terminal TER. Repeating the same process with the same input but different parameters shall give a high gain in another direction. In other words, thanks to the information sent by the terminal TER or terminals TER and associated with the main signal sent by the same terminal(s), the parameters necessary to implement a higher gain antenna can be determined. It should be noted that such a process is generally too complex to be performed on board which means that both the samples containing the main signal and the information associated to it must be transmitted to a ground station GS.

Figure 3:
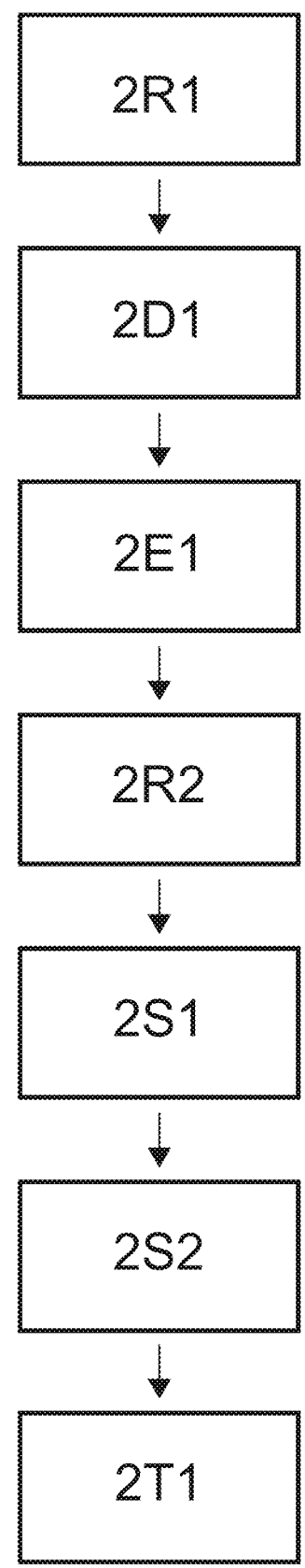
FIG. 3 illustrates a method according to a second embodiment of the invention.
Figure 4:
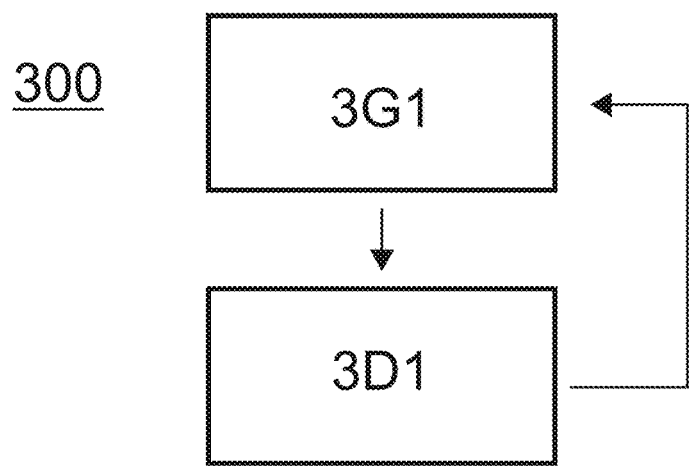
FIG. 4 illustrates a method according to a third embodiment of the invention.
Figure 5:
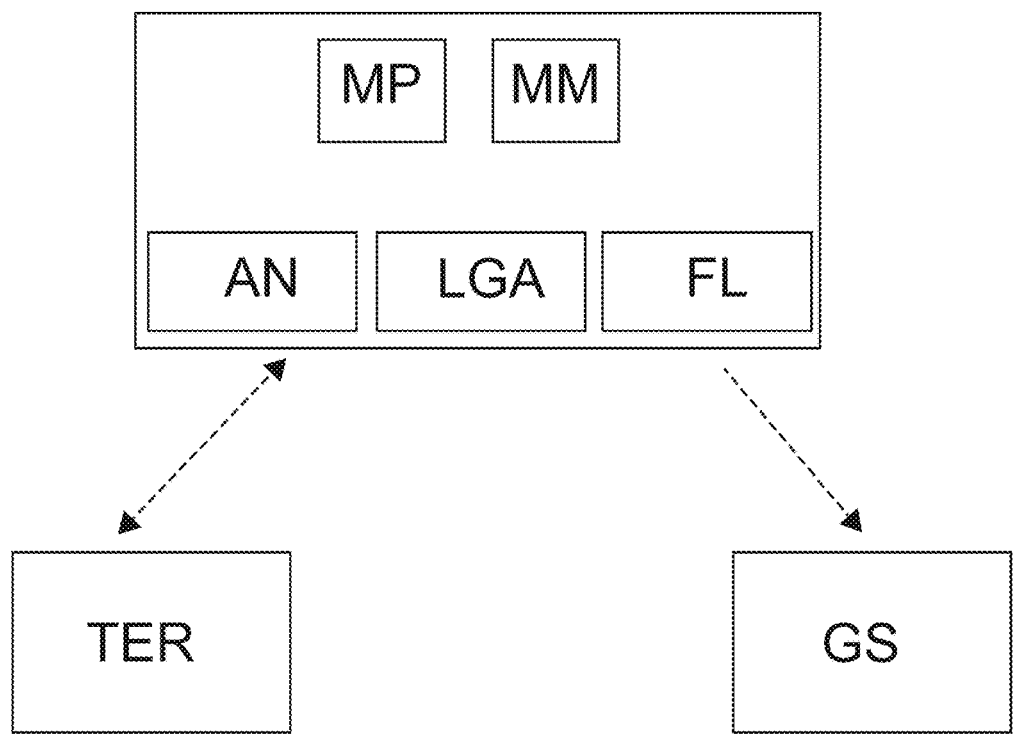
FIG. 5 illustrates a transmission system comprising the system to perform a method according to the first, second or third embodiment of the invention.

In order to implement such a method, an embodiment of the second aspect of the invention illustrated in FIG. 3 concerns a method 200 for processing a signal received from at least one terminal TER, the method being performed on-board by a satellite SAT equipped with an antenna array AN comprising a plurality of elements; the satellite SAT comprising a memory MM and a processing system MP adapted to process data contained in the memory MM.

The method 200 according to the second aspect of the invention comprises a step 2R1 of receiving a low bit rate signal from at least one terminal TER and a step 2D1 of demodulating the low bit rate signal received from the terminal TER. This low bit rate signal allows for instance a terminal TER to announce its intention to transmit (i.e. a request for a transmission of a larger message), along with its precise location, message size, transmission speed, time and frequency of transmission. This low bit rate signal can be listened by the satellite SAT using a single feed low-gain antenna LGA, or few elements of the antenna array, and can be demodulated in real-time.

Once the low bit rate signal has been demodulated, the method comprises a step 2E1 of extracting information from the demodulated low bit rate signal, the information containing data concerning a signal, the main signal, sent or to be sent by the terminal TER.

In an embodiment, the information contained in the low bit rate signal includes one or more of the following information:
the current position, direction of movement and/or speed of the terminal TER;
the time of transmission of the main signal;
the frequency slot used for transmission of the main signal.

As it will appear afterwards, the information provided by the low-bitrate signal can be used to drive the array antenna AN reception process, virtually aiming the array antenna AN in the direction of the terminal TER during processing of the main signal on the ground stations GS. It can also be used to drive the antenna array AN transmitting from the satellite on a packet by packet basis maximizing the antenna gain in the direction of the terminal TER. More particularly, if the satellite SAT is able to demodulate the low bitrate message in real time and the satellite SAT uses the antenna array AN also for transmission towards ground then the information received from the terminal TER can be used to generate a beam with high gain in the direction of the terminal TER, both for receiving the main signal and for transmitting acknowledgement or other information to the terminal.

In an embodiment, after the step 2E1 of extracting information from the demodulated low bit rate signal, the method comprises a step of acknowledging the receipt of the low bit rate signal in which the acknowledgment indicates the time to start emitting and/or the frequency slot to use. In an embodiment, the frequency slot to use is chosen by performing a real-time spectrum analysis of portions of the spectrum to be used for the signal emission and selecting the preferred frequency slot or the frequency slots to use.

Before or after emitting the low bitrate signal, the terminal TER will emit the main signal containing the actual message. In the case the satellite acknowledged the receipt of the low bit rate signal as described in the preceding paragraph, the emission is made at the specified time and/or using the specified frequency slot. To process this main signal, the method comprises a step 2R2 of receiving the main signal containing at least one message from at least one terminal TER, a step 2S1 of sampling the main signal received by each element of the antenna array AN and a step 2S2 of storing the sampled main signal in the satellite SAT memory MM (to be later demodulated either on-board or on-ground).

In an embodiment, the information received through the low bitrate signal is used to determine a period of time during which the sampling step is performed. In that case, the on-board sampling is not performed continuously but is done for the duration of the expected signal (eventually including some security margins, e.g. starting the sampling a few milliseconds before the expected start of the signal, and stopping the sampling a few milliseconds after the expected end of the signal) provided by the low-bit rate signal received previously from the same terminal TER. In other words, a terminal TER first sends, using a low-bit rate signal, a request to send a message giving information concerning this message to the satellite SAT so, when the satellite SAT receives the message, it can use the information provided in the low-bit rate signal to sample the signal containing the message. It will be appreciated, in the case where a plurality of terminals TER is involved, this method will satisfy the cumulative demand, considering all the request coming from the terminals TER of the plurality of terminals TER: all the intervals (start and end of transmission) will be summed together so that sampling will be performed at any moment when it is expected to receive a signal from at least one terminal TER.

In order to insure the delivery of the received signal, the method also comprises, when the satellite is in the range of a ground station GS, a step 2T1 of transmitting the stored samples to the ground station GS for further processing along with information extracted from the demodulated low bit rate signal and corresponding to the stored samples, for instance a copy of the corresponding transmission request issued by the terminal TER. The on-ground processing can then use this information, for each message, to ideally drive the virtual antenna steering in the direction of the signal corresponding to the message, with the corresponding maximum gain. Therefore, the demodulation of the various messages received by the satellite and transmitted to the ground station GS are performed faster with respect to the case where the information on a message is not available.

In the two methods 100, 200 described above, information on the signal can be provided to facilitate the demodulation process. To take advantage of this information, a third aspect of the invention concerns a method 300 for demodulation of at least one message in a signal received by each element of an antenna array AN. The method 300 comprises for each message, given the position of the transmitting terminal TER, the time of transmission and the frequency slot used by the terminal TER:

- a step 3G1 of generating numerically the appropriate phase shifts in the signals of each element of the antenna array AN to generate a maximum gain in the direction of the terminal TER and the maximum rejection of interference;
- based on the composition of signals using the phase shifts above, a step 3D1 of demodulating and decoding the message.

Thanks to this method, the information concerning the signal used to send a message or messages can be used to improve the demodulation process.

The invention claimed is:

1. A method for processing a signal received from at least one terminal during a current time interval, said method being performed on-board by a satellite; said satellite comprising a memory and a processing system adapted to process data contained in said memory, said method comprising:
    receiving, during the current time interval, a main signal, said main signal, containing at least one message from at least one terminal, each message having a priority level, messages with higher priority being demodulated first;
    sampling said main signal to obtain samples;
    storing the obtained samples into the satellite memory;
    first demodulating the messages corresponding to the current time interval contained in the samples stored in memory;
    when the satellite is in the range of a ground station, transmitting to said ground station the content of the memory;
wherein the first demodulating comprises, for each message of the messages contained in the samples and by priority order:
    demodulating and decoding the message;
    forwarding, using direct link or inter-satellite-link, the demodulated message to a ground station;
the demodulation sub-steps being repeated until the maximum number of messages that the processing system adapted to process data are able to demodulate during the time interval is reached, samples corresponding only to the messages already demodulated being deleted from memory.

2. The method according to claim 1, further comprising, when the satellite is not in the range of a ground station, transmitting to said ground station using inter-satellite link the content of the memory.

3. The method according to claim 1, wherein the first demodulating comprises:
    estimating the number of remaining non-demodulated messages in the samples stored in the memory;
    if there are no remaining messages, deleting the samples in the satellite memory.

4. The method according to claim 1, wherein in the sub-step of forwarding the demodulated messages to a ground station, additional information concerning said demodulated messages is forwarded along with their corresponding messages.

5. The method according to claim 4, wherein, to obtain the additional information, the method comprises:
    receiving, a low bit rate signal from at least one terminal;
    demodulating the low bit rate signal;
    extracting information from the demodulated low bit rate signal, said information containing data concerning the main signal sent or to be sent by the user terminal.

6. The method according to claim 5, wherein the information contained in the demodulated low bit rate signal include one or more of the following information:
    the current position, direction of movement and/or speed of the terminal;
    the time of transmission of the main signal;
    the frequency slot used for transmission of the main signal.

7. The method according to claim 6, further comprising, after the step of extracting information from the demodulated low bit rate signal, acknowledging the receipt of the low bit rate signal in which the acknowledgement indicates the time to start emitting and/or the frequency slot to use.

8. The method according to claim 7, wherein the frequency slot to use is chosen by performing a real-time spectrum analysis of portion of the spectrum to be used for the main signal emission and select the preferred frequency slot or the frequency slots to use.

9. The method according to claim 1, wherein the information received through the low bitrate signal is used to determine a period of time during which the sampling step is performed or to determine which samples are sent to the ground station.

10. The method according to claim 1, wherein the step of receiving a signal from at least one terminal is preceded by a step of sending, using at least one terminal, a main signal comprising at least one message, said signal being emitted using a first effective radiated power when its priority level is above a predefined value and using a second effective radiated power otherwise.

11. The method according to claim 1, wherein the step of receiving a signal from at least one terminal is preceded by a step of sending, using at least one terminal, a main signal comprising at least one message, said signal being emitted using a first frequency slot when its priority level is above a predefined value and using a second frequency slot otherwise.

12. The method according to claim 1, wherein the first demodulating of messages contained in the samples stored is also applied to samples received during time intervals previous to the current time interval, the samples corresponding to the current time interval being processed first.

13. A satellite comprising a system adapted to execute the steps of the method according to claim 1.

\* \* \* \* \*